United States Patent
Damnjanovic et al.

(10) Patent No.: US 8,599,706 B2
(45) Date of Patent: Dec. 3, 2013

(54) RANDOM ACCESS SIGNALING TRANSMISSION FOR SYSTEM ACCESS IN WIRELESS COMMUNICATION

(75) Inventors: Aleksandar Damnjanovic, San Diego, CA (US); Juan Montojo, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 859 days.

(21) Appl. No.: 12/439,716

(22) PCT Filed: Oct. 3, 2007

(86) PCT No.: PCT/US2007/080319
§ 371 (c)(1),
(2), (4) Date: Jun. 5, 2009

(87) PCT Pub. No.: WO2008/042967
PCT Pub. Date: Apr. 10, 2008

(65) Prior Publication Data
US 2010/0309877 A1 Dec. 9, 2010

Related U.S. Application Data

(60) Provisional application No. 60/828,058, filed on Oct. 3, 2006.

(51) Int. Cl.
*H04J 1/16* (2006.01)
(52) U.S. Cl.
USPC ........... 370/252; 370/278; 370/311; 455/522; 455/69; 455/127.1
(58) Field of Classification Search
USPC ......... 370/329, 335, 418, 330, 336, 282, 278, 370/252, 311; 455/522, 69, 63.1
See application file for complete search history.

(56) References Cited

U.S. PATENT DOCUMENTS

| | | |
|---|---|---|
| 6,738,366 B1 | 5/2004 | Etemad et al. |
| 7,054,298 B1 | 5/2006 | Kim et al. |

(Continued)

FOREIGN PATENT DOCUMENTS

| | | |
|---|---|---|
| DE | 102005011426 | 9/2006 |
| EP | 1531644 | 5/2005 |

(Continued)

OTHER PUBLICATIONS

ETSI: "3GPP TR 25.814 v 7.0.0, Physical layer aspects for evolved Universal Terrestrial Radio Access (UTRA)" 3rd Generation Partnership Project, Jun. 15, 2006, p. 1-5, 67-107, XP002481722.

(Continued)

*Primary Examiner* — Dady Chery
(74) *Attorney, Agent, or Firm* — Ashish L. Patel

(57) ABSTRACT

Techniques for transmitting random access signaling for system access are described. In an aspect, random access signaling may be sent based on at least one transmission parameter having different values for different user equipment (UE) classes. At least one parameter value may be determined based on a particular UE class, and the random access signaling may be sent based on the determined parameter value(s). The random access signaling may be a random access preamble, and the at least one transmission parameter may include a target SNR, a backoff time, and/or a power ramp. The random access preamble may then be sent based on a target SNR value, a power ramp value, and/or a backoff time value for the particular UE class. In another aspect, a message for system access may be sent based on a power control correction received in a random access response for the random access preamble.

33 Claims, 8 Drawing Sheets

(56) References Cited

U.S. PATENT DOCUMENTS

| | | | |
|---|---|---|---|
| 2002/0077138 A1* | 6/2002 | Bark et al. | 455/522 |
| 2004/0032877 A1* | 2/2004 | Chuah et al. | 370/444 |
| 2004/0147274 A1* | 7/2004 | Khawand et al. | 455/522 |
| 2006/0111104 A1 | 5/2006 | Hyslop | |
| 2011/0230199 A1* | 9/2011 | Patabandi et al. | 455/450 |

FOREIGN PATENT DOCUMENTS

| | | |
|---|---|---|
| EP | 1555765 | 7/2005 |
| JP | 2000209661 A | 7/2000 |
| JP | 2002524990 A | 8/2002 |
| JP | 2002539707 | 11/2002 |
| JP | 2006515737 A | 6/2006 |
| RU | 2191479 C2 | 10/2002 |
| RU | 2209528 C2 | 7/2003 |
| WO | WO9637079 | 11/1996 |
| WO | 9824250 | 6/1998 |

OTHER PUBLICATIONS

Texas Instruments: "Random Access usage for RRC state transitions and mobility support" 3GPP Draft; R2-060852, 3rd Generation Partnership Project (3GPP), Mobile Competence Centre; 650; Route DES Lucioles; F-06921 Sophia-Antipolis Cedex, France, vol. tsg_ran\WG2_RL2\TSGR2_52\Documents\Joint_R1_R2, no Athens, Greece; 20060327, Mar. 20, 2006, XP050131002.

International Search Report—PCT/US2007/080319, International Search Authority—European Patent Office—Jan. 13, 2009.

Written Opinion—PCT/US2007/080319, International Search Authority—European Patent Office—Jan. 13, 2009.

Taiwan Search Report—TW096137087—TIPO—Apr. 22, 2011.

\* cited by examiner

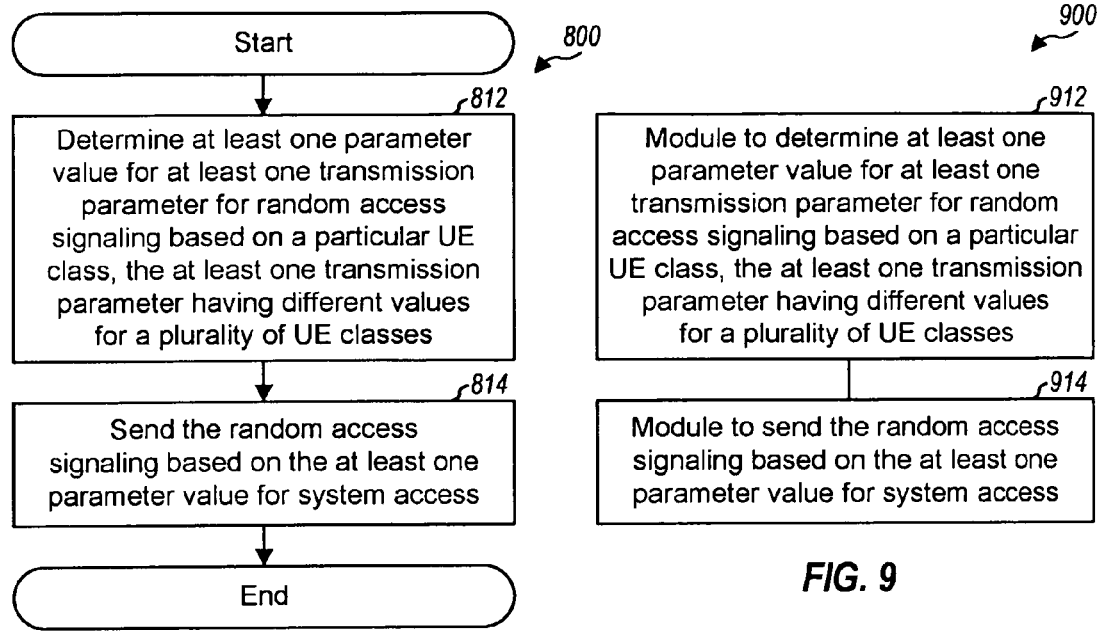
FIG. 8
FIG. 9
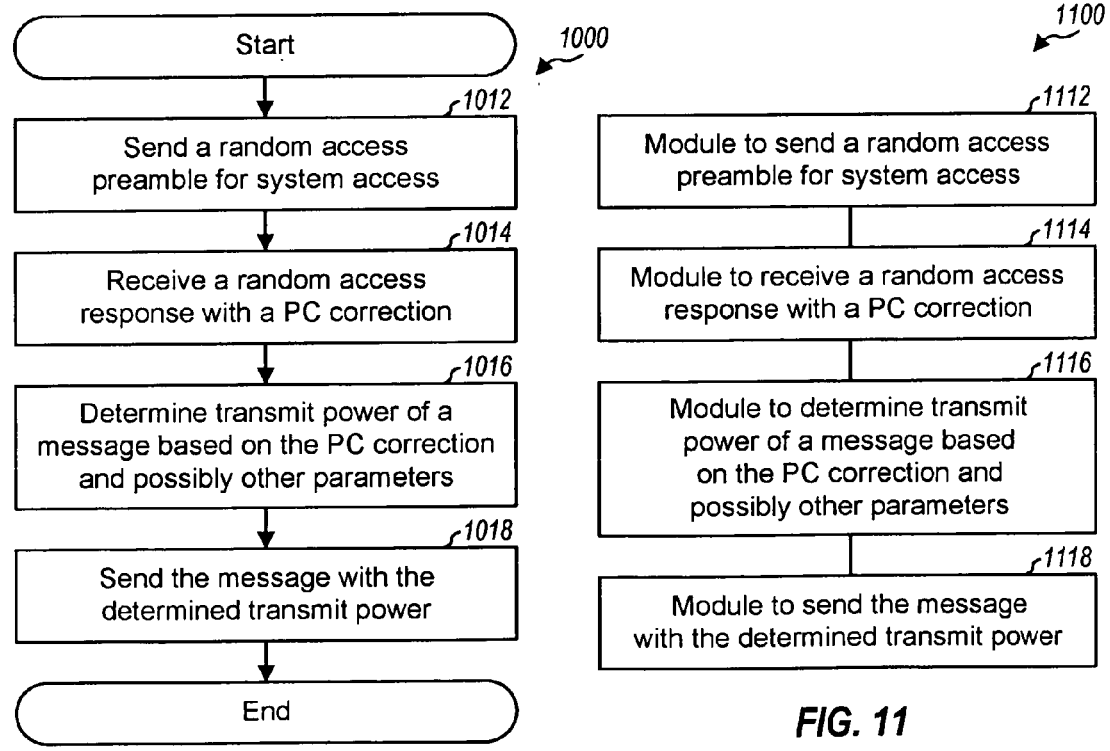
FIG. 10
FIG. 11

RANDOM ACCESS SIGNALING TRANSMISSION FOR SYSTEM ACCESS IN WIRELESS COMMUNICATION

The present application claims priority to provisional U.S. Application Ser. No. 60/828,058, filed Oct. 3, 2006, and assigned to the assignee hereof and incorporated herein by reference.

BACKGROUND

I. Field

The present disclosure relates generally to communication, and more specifically to techniques for accessing a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include any number of base stations that can support communication for any number of user equipments (UEs). Each UE may communicate with one or more base stations via transmissions on the downlink and uplink. The downlink (or forward link) refers to the communication link from the base stations to the UEs, and the uplink (or reverse link) refers to the communication link from the UEs to the base stations.

A UE may transmit a random access preamble (or an access probe) on the uplink when the UE desires to gain access to the system. A base station may receive the random access preamble and respond with a random access response (or an access grant) that may contain pertinent information for the UE. Uplink resources are consumed to transmit the random access preamble, and downlink resources are consumed to transmit the random access response. Furthermore, the random access preamble and other signaling sent for system access may cause interference on the uplink. There is therefore a need in the art for techniques to efficiently transmit the random access preamble and signaling for system access.

SUMMARY

Techniques for efficiently transmitting random access signaling for system access are described herein. In an aspect, a UE may send random access signaling based on at least one transmission parameter having different values for different UE classes, which may provide certain advantages described below. At least one parameter value for the at least one transmission parameter may be determined based on a particular UE class. The random access signaling may then be sent based on the at least one parameter value for system access.

In one design, the random access signaling may be a random access preamble, which is signaling sent first for system access. The at least one transmission parameter may comprise a target signal-to-noise ratio (SNR) for the random access preamble. The transmit power of the random access preamble may be determined based on a target SNR value for the particular UE class and other parameters. The random access preamble may then be sent with the determined transmit power. In another design, the at least one transmission parameter may comprise a backoff time, and the amount of time to wait between successive transmissions of the random access preamble may be determined based on a backoff time value for the particular UE class. In yet another design, the at least one transmission parameter may comprise a power ramp, and the transmit power for successive transmissions of the random access preamble may be determined based on a power ramp value for the particular UE class.

In another design, the random access signaling may be a message sent after receiving a random access response for the random access preamble. The at least one transmission parameter may comprise a power offset between a first channel used to send the random access preamble and a second channel used to send the message. The transmit power of the message may be determined based on a power offset value for the particular UE class, and the message may be sent with the determined transmit power.

In another aspect, a message for system access may be sent based on a power control (PC) correction. A random access preamble may be sent for system access, and a random access response with a PC correction may be received. The transmit power of the message may be determined based on the PC correction and other parameters such as the power offset between the channels used to send the random access preamble and the message. The message may then be sent with the determined transmit power.

Various aspects and features of the disclosure are described in further detail below.

BRIEF DESCRIPTION OF THE DRAWINGS

FIG. 8 shows a process for transmitting random access signaling.

FIG. 9 shows an apparatus for transmitting random access signaling.

FIG. 10 shows a process for transmitting a message for system access.

FIG. 11 shows an apparatus for transmitting a message for system access.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16

(WiMAX), IEEE 802.20, Flash-OFDM®, etc. UTRA, E-UTRA and GSM are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, GSM, UMTS and LTE are described in documents from an organization named "3rd Generation Partnership Project" (3GPP). cdma2000 and UMB are described in documents from an organization named "3rd Generation Partnership Project 2" (3GPP2). These various radio technologies and standards are known in the art. For clarity, certain aspects of the techniques are described below for system access in LTE, and LTE terminology is used in much of the description below.

Figure 1:
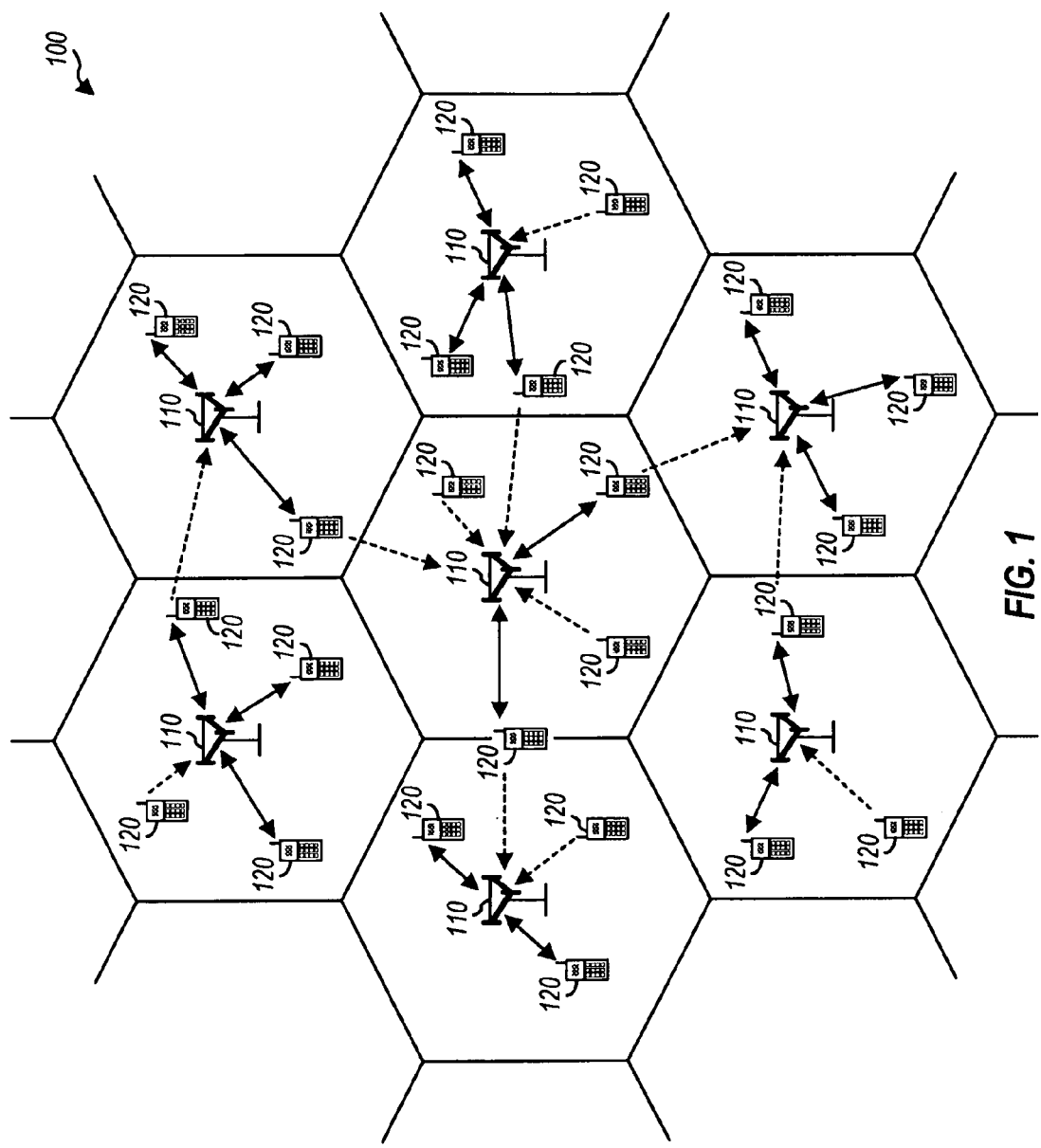
FIG. 1 shows a wireless multiple-access communication system.

FIG. 1 shows a wireless multiple-access communication system 100 with multiple evolved Node Bs (eNBs) 110. An eNB may be a fixed station used for communicating with the UEs and may also be referred to as a Node B, a base station, an access point, etc. Each eNB 110 provides communication coverage for a particular geographic area. The overall coverage area of each eNB 110 may be partitioned into multiple (e.g., three) smaller areas. In 3GPP, the term "cell" can refer to the smallest coverage area, of an eNB and/or an eNB subsystem serving this coverage area. In other systems, the term "sector" can refer to the smallest coverage area and/or the subsystem serving this coverage area. For clarity, 3GPP concept of cell is used in the description below.

UEs 120 may be dispersed throughout the system. A UE may be stationary or mobile and may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, etc. A UE may communicate with one or more eNBs via transmissions on the downlink and uplink. In FIG. 1, a solid line with double arrows indicates communication between an eNB and a UE. A broken line with a single arrow indicates a UE attempting to access the system.

Figure 2:
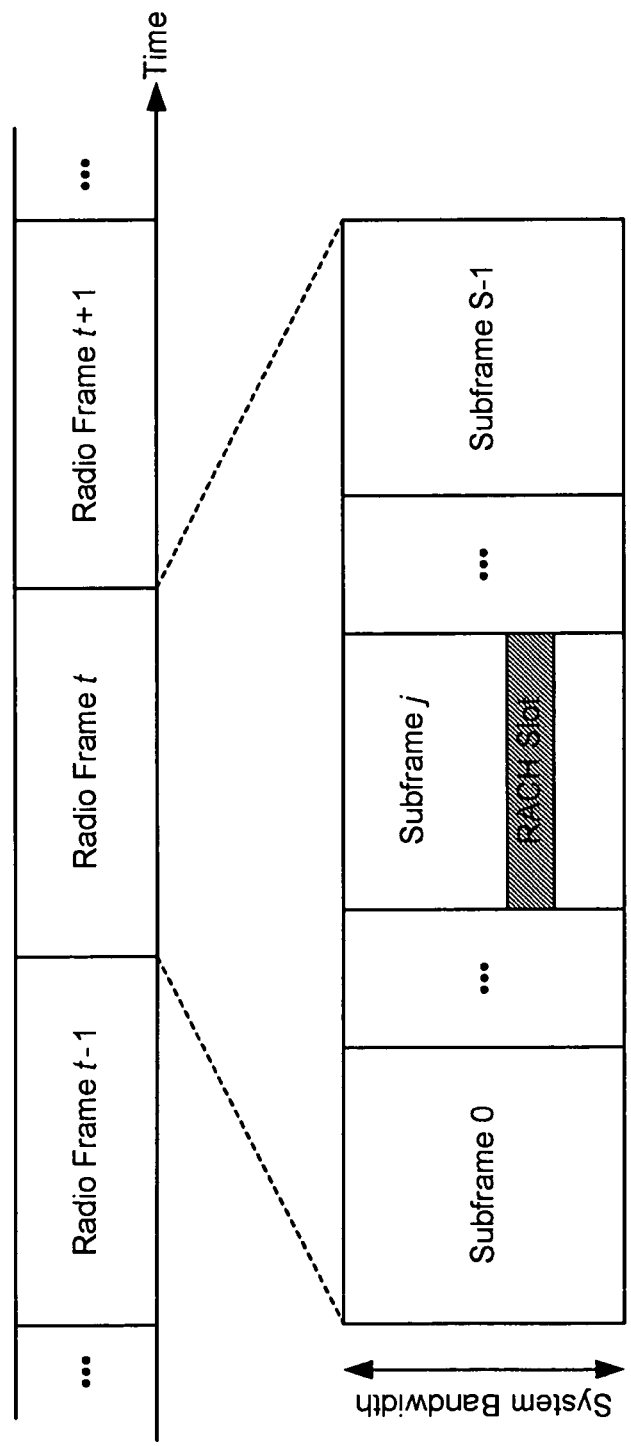
FIG. 2 shows a transmission structure for the uplink.

FIG. 2 shows an example transmission structure for the uplink. The transmission timeline may be partitioned into units of radio frames. Each radio frame may be partitioned into multiple (S) subframes, and each subframe may include multiple symbol periods. In one design, each radio frame has a duration of 10 milliseconds (ms) and is partitioned into 10 subframes, and each subframe has a duration of 1 ms and includes 12 or 14 symbol periods. The radio frames may also be partitioned in other manners.

The time-frequency resources available for the uplink may be allocated for different types of transmission such as traffic data, signaling/control information, etc. In one design, one or more Random Access Channel (RACH) slots may be defined in each radio frame and may be used by the UEs for system access. In general, any number of RACH slots may be defined. Each RACH slot may have any time-frequency dimension and may be located anywhere within a radio frame. In one design that is shown in FIG. 2, a RACH slot spans one subframe and covers a predetermined bandwidth of 1.25 MHz. The RACH slot location (e.g., the specific subframe and portion of the system bandwidth used for the RACH slot) may be conveyed in system information that is broadcast on a Broadcast Channel (BCH) by each cell. Other parameters for the RACH slot (e.g., signature sequences being used) may be fixed or conveyed via the system information.

The system may support one set of transport channels for the downlink and another set of transport channels for the uplink. These transport channels may be used to provide information transfer services to Medium Access Control (MAC) and higher layers. The transport channels may be described by how and with what characteristics information is sent over a radio link. The transport channels may be mapped to physical channels, which may be defined by various attributes such as modulation and coding, mapping of data to resource blocks, etc. Table 1 lists some physical channels used for the downlink (DL) and uplink (UL) in LTE in accordance with one design.

TABLE 1

| Link | Channel | Channel Name | Description |
|------|---------|--------------|-------------|
| DL | PBCH | Physical Broadcast Channel | Carry system information broadcast over a cell. |
| DL | PDCCH | Physical Downlink Control Channel | Carry UE-specific control information for the PDSCH. |
| DL | PDSCH | Physical Downlink Shared Channel | Carry data for UEs in a shared manner. |
| UL | PRACH | Physical Random Access Channel | Carry random access preambles from UEs attempting to access the system. |
| UL | PUCCH | Physical Uplink Control Channel | Carry control information from UEs such as CQI, ACK/NAK, resource requests, etc. |
| UL | PUSCH | Physical Uplink Shared Channel | Carry data sent by a UE on uplink resources assigned to the UE. |

The physical channels in Table 1 may also be referred to by other names. For example, the PDCCH may also be referred to as a Shared Downlink Control Channel (SDCCH), Layer 1/Layer 2 (L1/L2) control, etc. The PDSCH may also be referred to as a downlink PDSCH (DL-PDSCH). The PUSCH may also be referred to as an uplink PDSCH (UL-PDSCH).

The transport channels may include a Downlink Shared Channel (DL-SCH) used to send data to the UEs, an Uplink Shared Channel (UL-SCH) used to send data by the UEs, a RACH used by the UEs to access the system, etc. The DL-SCH may be mapped to the PDSCH and may also be referred to as a Downlink Shared Data Channel (DL-SDCH). The UL-SCH may be mapped to the PUSCH and may also be referred to as an Uplink Shared Data Channel (UL-SDCH). The RACH may be mapped to the PRACH.

A UE may operate in one of several states such as LTE Detached, LTE Idle and LTE Active states, which may be associated with RRC_NULL, RRC_IDLE and RRC_CONNECTED states, respectively. Radio Resource Control (RRC) may perform various functions for establishment, maintenance and termination of calls. In the LTE Detached state, the UE has not accessed the system and is not known by the system. The UE may power up in the LTE Detached state and may operate in the RRC_NULL state. The UE may transition to either the LTE Idle state or LTE Active state upon accessing the system and performing registration. In the LTE Idle state, the UE may have registered with the system but may not have any data to exchange on the downlink or uplink. The UE may thus be idle and operate in the RRC_IDLE state. In the LTE Idle state, the UE and the system may have pertinent context information to allow the UE to quickly transition to the LTE Active state. The UE may transition to the LTE Active state when there is data to send or receive. In the LTE Active state, the UE may actively communicate with the system on the downlink and/or uplink and may operate in the RRC_CONNECTED state.

The UE may transmit a random access preamble on the uplink whenever the UE desires to access the system, e.g., at power up, if the UE has data to send, if the UE is paged by the system, etc. A random access preamble is signaling that is sent first for system access and may also be referred to as an access signature, an access probe, a random access probe, a signature sequence, a RACH signature sequence, etc. The random access preamble may include various types of information and may be sent in various manners, as described below. An eNB may receive the random access preamble and may respond by sending a random access response to the UE. A random access response may also be referred to as an access grant, an access response, etc. The random access response may carry various types of information and may be sent in various manners, as described below. The UE and eNB may further exchange signaling to set up a radio connection and may thereafter exchange data.

Figure 3:
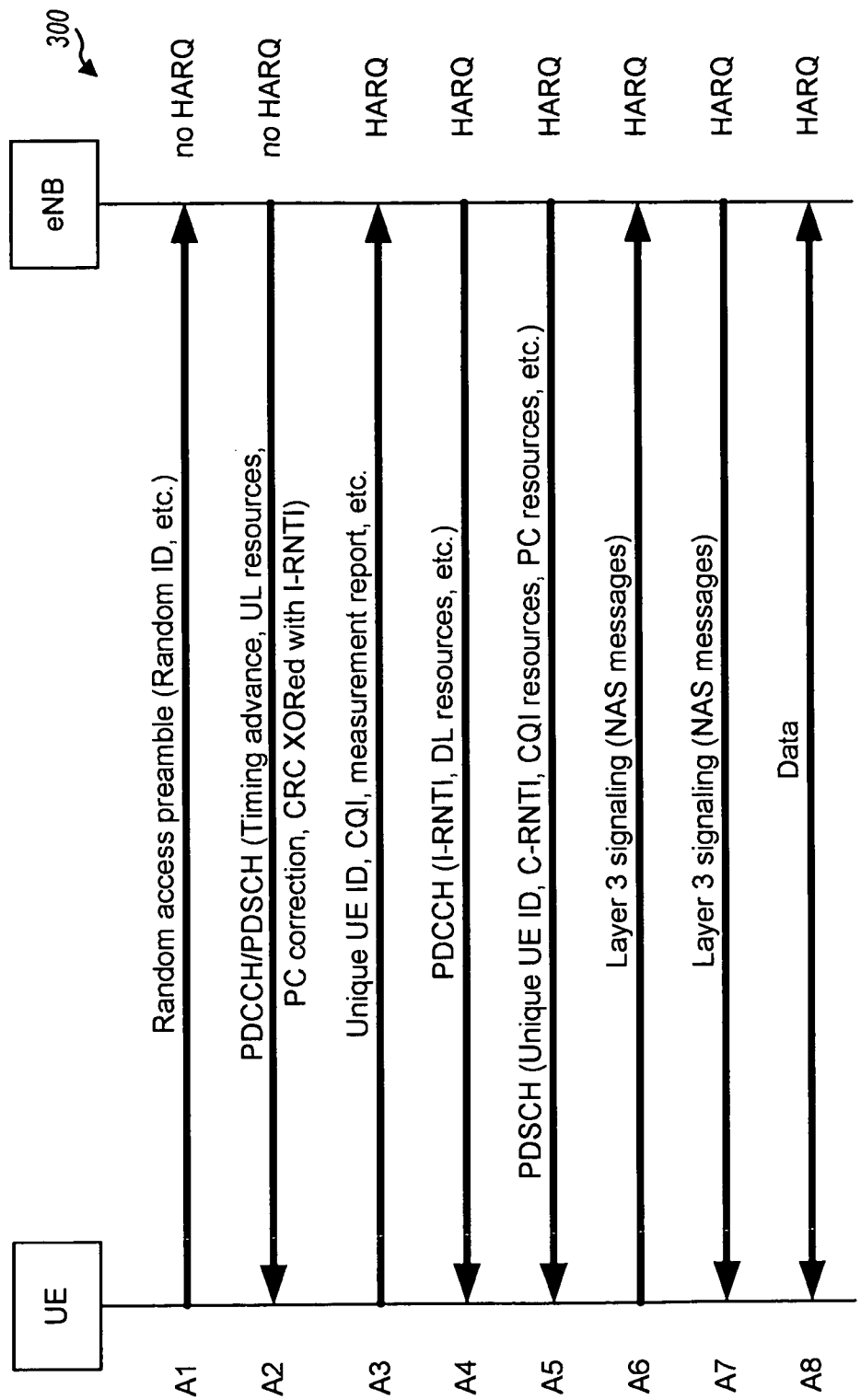
FIG. 3 shows a message flow for initial system access.

FIG. 3 shows a message flow for a design of a random access procedure 300. In this design, the UE may be in the RRC_NULL or RRC_IDLE state and may access the system by sending a random access preamble (step A1). The random access preamble may include L bits of information, where L may be any integer value. An access sequence may be selected from a pool of $2^L$ available access sequences and sent for the random access preamble. In one design, the random access preamble includes L=6 bits of information, and one access sequence is selected from a pool of 64 access sequences. The $2^L$ access sequences may be of any length and may be designed to have good detection properties. For example, 64 access sequences may be defined based on different cyclic shifts of a Zardoff-Chu sequence of a suitable length.

The random access preamble may include a random identifier (ID) that may be pseudo-randomly selected by the UE and used to identify the random access preamble from the UE. The random access preamble may also include one or more additional bits for downlink channel quality indicator (CQI) and/or other information. The downlink CQI may be indicative of the downlink channel quality as measured by the UE and may be used to send subsequent downlink transmission to the UE and/or to assign uplink resources to the UE. In one design, a 6-bit random access preamble may include a 4-bit random ID and a 2-bit CQI. In another design, a 6-bit random access preamble may include a 5-bit random ID and a 1-bit CQI. The random access preamble may also include different and/or additional information.

The UE may determine an Implicit Radio Network Temporary Identifier (I-RNTI) that may be used as a temporary ID for the UE during system access. The UE may be identified by the I-RNTI until a more permanent ID such as a Cell RNTI (C-RNTI) is assigned to the UE. In one design, the I-RNTI may include the following:

System time (8 bits)—time when the access sequence is sent by the UE, and

RA-preamble identifier (6 bits)—index of the access sequence sent by the UE.

The I-RNTI may have a fixed length (e.g., 16 bits) and may be padded with a sufficient number of zeros (e.g., 2 zeros) to achieve the fixed length. The system time may be given in units of radio frames, and an 8-bit system time may be unambiguous over 256 radio frames or 2560 ms. In another design, the I-RNTI is composed of 4-bit system time, 6-bit RA-preamble identifier, and padding bits (if needed). In general, the I-RNTI may be formed with any information that may (i) allow the UE or random access preamble to be individually addressed and (ii) reduce the likelihood of collision with another UE using the same I-RNTI. The lifetime of the I-RNTI may be selected based on the maximum expected response time for an asynchronous response to the random access preamble. The I-RNTI may also include system time and a pattern (e.g., 000 . . . 0 in front of system time) to indicate that the RNTI addresses the RACH.

In another design, multiple RACHs may be available, and the UE may randomly select one of the available RACHs. Each RACH may be associated with a different Random Access RNTI (RA-RNTI). The UE may be identified by a combination of the RA-preamble identifier and the RA-RNTI of the selected RACH during the system access. An I-RNTI may be defined based on any combination of the RA-preamble identifier, RA-RNTI, and system time, e.g., the RA-preamble identifier and RA-RNTI, or the RA-RNTI and system time, etc. System time may be beneficial for asynchronous response to the random access preamble. If the I-RNTI is formed based on the RA-RNTI and system time, then the UE may be identified based on the RA-preamble identifier sent separately, e.g., on the PDSCH. The UE may send the random access preamble on the selected RACH.

An eNB may receive the random access preamble from the UE and may respond by sending a random access response on the PDCCH and/or PDSCH to the UE (step A2). The eNB may determine the I-RNTI of the UE in the same manner as the UE. The eNB may asynchronously respond to the random access preamble from the UE within the lifetime of the I-RNTI. In one design, the PDCCH/PDSCH may carry the following:

Timing advance—indicate adjustment to the transmit timing of the UE,

UL resources—indicate resources granted to the UE for uplink transmission,

PC correction—indicate adjustment to the transmit power of the UE, and

I-RNTI—identify the UE or access attempt for which the access grant is sent.

A cyclic redundancy check (CRC) may be generated based on all information being sent on the PDCCH/PDSCH. The CRC may be exclusive ORed (XORed) with the I-RNTI (as shown in FIG. 3), the RA-preamble identifier, the RA-RNTI, and/or other information to identify the UE being addressed. Different and/or other information may also be sent on the PDCCH/PDSCH in step A2.

The UE may then respond with a unique UE ID in order to resolve possible collision (step A3). The unique UE ID may be an International Mobile Subscriber Identity (IMSI), a Temporary Mobile Subscriber Identity (TMSI), another random ID, etc. The unique UE ID may also be a registration area ID if the UE has already registered in a given area. The UE may also send downlink CQI, pilot measurement report, etc., along with the unique UE ID.

The eNB may receive a unique "handle" or pointer to the unique UE ID. The eNB may then assign a C-RNTI and control channel resources to the UE. The eNB may send a response on the PDCCH and PDSCH (steps A4 and A5). In one design, the PDCCH may carry a message containing the I-RNTI and DL resources indicating where remaining information is sent on the PDSCH to the UE. In one design, the PDSCH may carry a message containing the unique UE ID, the C-RNTI (if assigned), CQI resources used by the UE to send downlink CQI, PC resources used to send PC corrections to the UE, etc. The messages sent on the PDCCH and PDSCH may also carry different and/or other information.

The UE may decode the messages sent on the PDCCH and PDSCH to the UE. After decoding these two messages, the UE has sufficient resources configured and can exchange Layer 3 signaling with the eNB (steps A6 and A7). The Layer 3 signaling may include Non-Access Stratum (NAS) messages for authentication of the UE, configuration of the radio link between the UE and eNB, connection management, etc. The UE and eNB may exchange data after completing the Layer 3 signaling (step A8).

Figure 4:
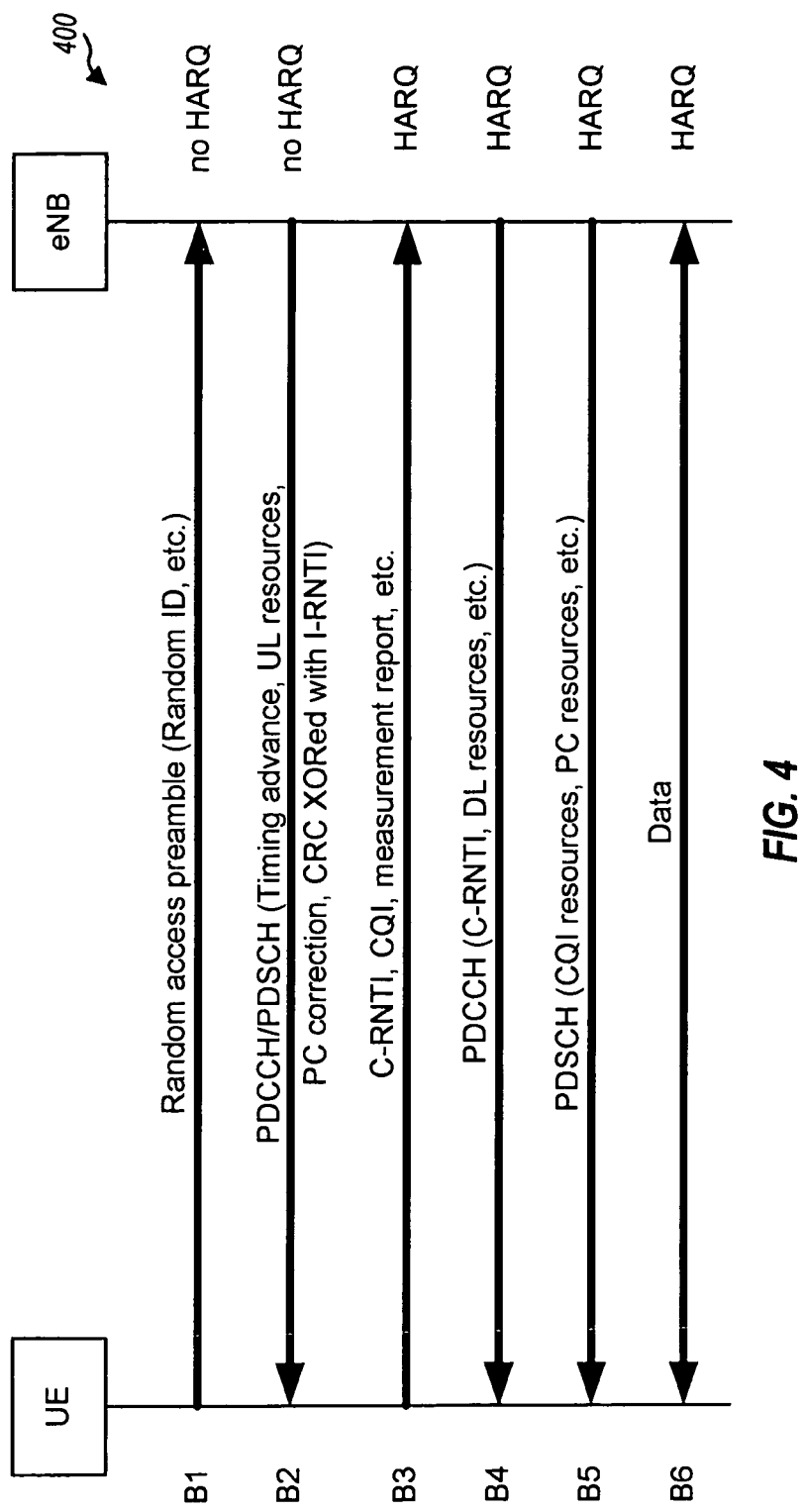
FIG. 4 shows a message flow for system access to transition to an active state.

FIG. 4 shows a message flow for a design of a random access procedure 400. In this design, the UE may be in the RRC_IDLE or RRC_CONNECTED state and may already have a C-RNTI assigned to the UE. The UE may access the system from the RRC_IDLE state in response to receiving data to send or from the RRC_CONNECTED state in response to a handover command. The UE may send a random access preamble, which may include a random ID and possibly one or more additional bits for downlink CQI and/or other information (step B1).

An eNB may receive the random access preamble from the UE and may respond by sending a random access response on the PDCCH and/or PDSCH to the UE (step B2). The random access response may include timing advance, UL resources, PC correction, and a CRC that may be XORed with an I-RNTI, an RA-preamble identifier, an RA-RNTI, and/or other information to identify the UE. The UE may then send its C-RNTI, downlink CQI, pilot measurement report and/or other information to the eNB (step B3). The eNB may then send a response on the PDCCH and PDSCH (steps B4 and B5). The PDCCH may carry a message containing the C-RNTI and the DL resources for the PDSCH. The PDSCH may carry a message containing the CQI resources, PC resources, etc. The UE may decode the messages sent on the PDCCH and PDSCH to the UE. Layer 3 signaling exchanges may be omitted since the UE has been authenticated prior to being assigned the C-RNTI. After step B5, the UE has sufficient resources configured and can exchange data with the eNB (step B6).

Figure 5:
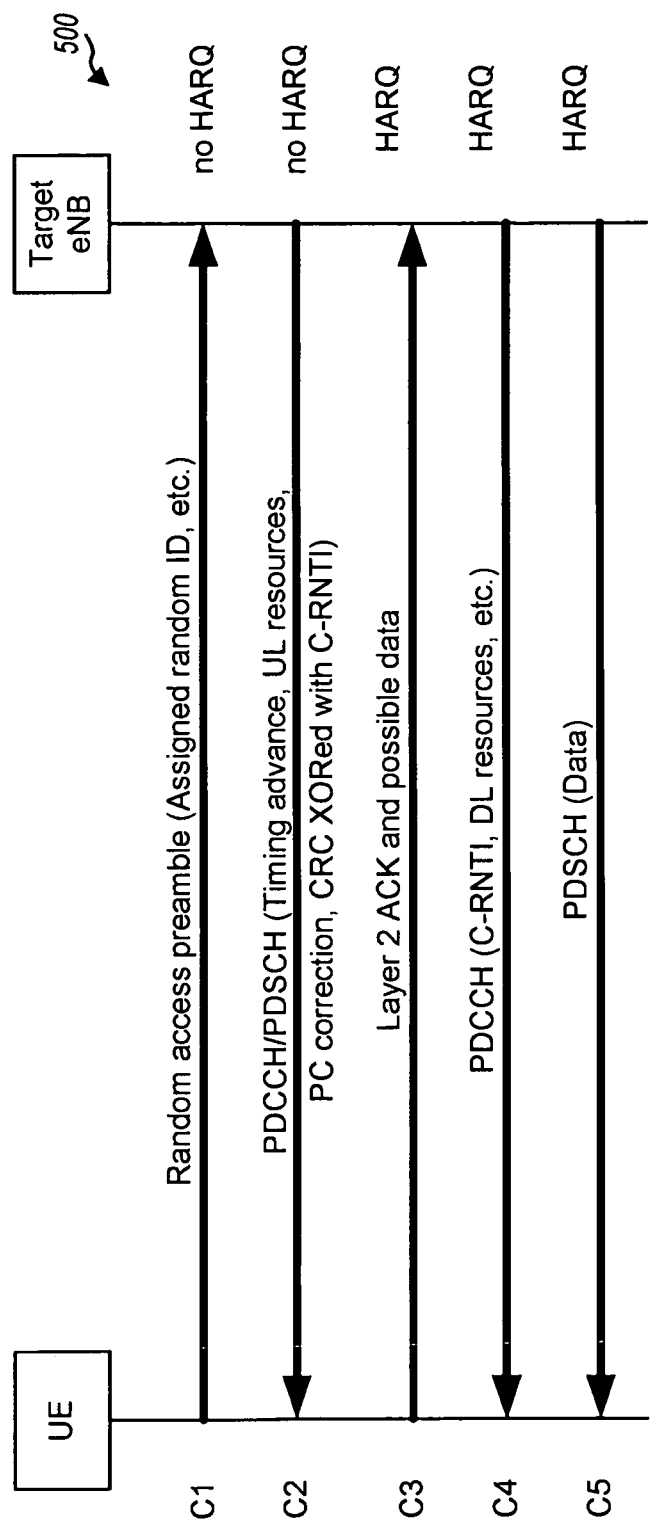
FIG. 5 shows a message flow for system access for handover.

FIG. 5 shows a message flow for a design of a random access procedure 500 for handover. In this design, the UE may be communicating with a source eNB and may be handed over to a target eNB. The UE may be assigned a random ID by the source eNB for use to access the target eNB. To avoid collision, a subset of all possible random IDs may be reserved for handover, and the random ID assigned to the UE may be selected from this reserved subset. Information regarding the subset of reserved random IDs may be broadcast to all UEs.

The source eNB may inform the target eNB of the C-RNTI, random ID, CQI resources, PC resources and/or other information for the UE. Collision resolution may not be necessary due to a one-to-one mapping between the assigned random ID and the C-RNTI of the UE. The target eNB may thus have pertinent context information for the UE prior to the random access procedure. For simplicity, FIG. 5 shows the random access procedure between the UE and the target eNB.

The UE may send a random access preamble, which may include the random ID assigned to the UE and possibly other information (step C1). The target eNB may receive the random access preamble and may respond by sending a random access response on the PDCCH and/or PDSCH to the UE (step C2). The random access response may include timing advance, UL resources, PC correction, and a CRC that may be XORed with the C-RNTI of the UE. After step C2, the UE has sufficient resources configured and can exchange data with the eNB. The UE may send a Layer 2 ACK for the information received in step C2 and may also send data and/or other information (step C3). The eNB may then send data to the UE on the PDSCH (step C5) and may send signaling for the PDCCH on the PDCCH (step C4).

FIGS. 3 through 5 show some example random access procedures that may be used for initial system access, system access while idle, and system access for handover. Other random access procedures may also be used for system access.

As shown in FIGS. 3 through 5, hybrid automatic retransmission (HARQ) may be used for messages sent in steps A3, B3 and C3 and later. For HARQ, a transmitter may send a transmission of a message, and a receiver may send an ACK if the message is decoded correctly or a NAK if the message is decoded in error. The transmitter may send one or more retransmissions of the message, if needed, until an ACK is received for the message or the maximum number of retransmissions has been sent.

Figure 6:
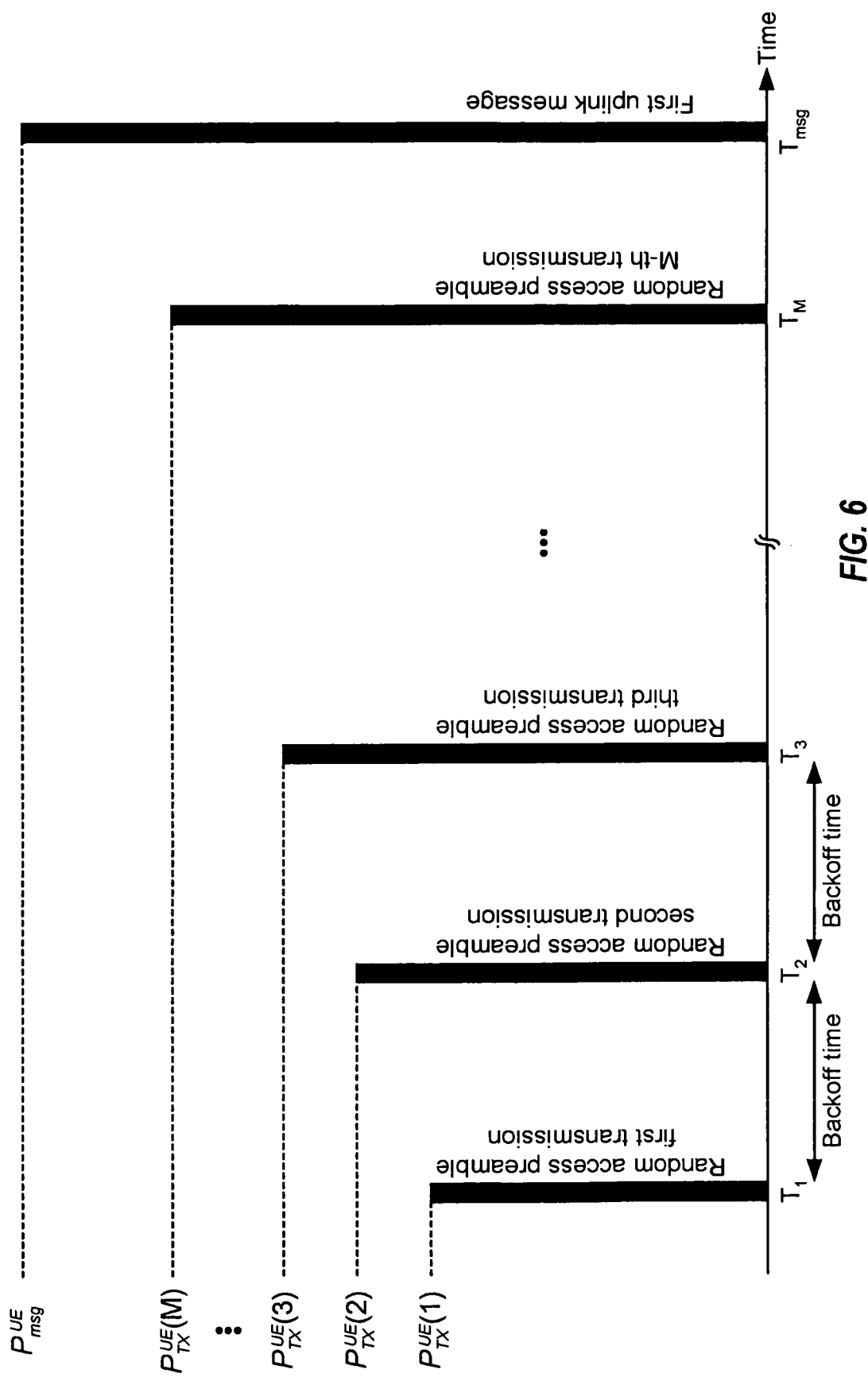
FIG. 6 shows successive random access preamble transmissions with backoff.

FIG. 6 shows a design of random access preamble transmission by the UE. The UE may transmit a random access preamble with an initial transmit power of $P_{TX}^{UE}(1)$ at time $T_1$ to a target eNB. The UE may then wait for a random access response from the eNB. If a random access response is not received within a predetermined time interval, then the UE may wait a particular backoff time and then retransmit the random access preamble in the next available RACH slot after the backoff time. The second transmission of the random access preamble is sent with higher transmit power of $P_{TX}^{UE}(2)$ at time $T_2$. The UE may continue to retransmit the random access preamble with progressively higher transmit power, after waiting a backoff time for each failed transmission, until either (1) a random access response is received from the eNB or (2) the maximum number of transmissions has been sent for the random access preamble. In the example shown in FIG. 6, the UE receives a random access response after M transmissions of the random access preamble, where in general $M \geq 1$.

After receiving the random access response, the UE may transmit the first uplink message (e.g., corresponding to step A3, B3 or C3 in FIG. 3, 4 or 5, respectively) with transmit power of $P_{msg}^{UE}$ at time $T_{msg}$. The transmit power $P_{msg}^{UE}$ may be selected to achieve reliable reception of the first uplink message while reducing uplink interference.

In one design, the transmit power for the m-th transmission of the random access preamble, $P_{TX}^{UE}(m)$, may be determined based on an open loop method, as follows:

$$P_{TX}^{UE}(m) = \frac{1}{P_{RX}^{UE}} \cdot SNR_{target} \cdot \left( \frac{1 + N_0 + I_{oc}^{UE}}{I_{or}} \right) \cdot P_{TX}^{eNB} \cdot (N_0 + I_{oc}^{eNB}) \cdot \delta \cdot K_{ramp}(m), \quad \text{Eq (1)}$$

where $P_{RX}^{UE}$ is the received power at the UE for time-frequency slots used for a reference signal (e.g., a pilot signal) from the recipient eNB, $SNR_{target}$ is a target SNR for the random access preamble, $N_0$ is Gaussian noise at the UE, $I_{oc}^{UE}$ is interference from other eNBs at the UE, $I_{or}$ is the received power for the recipient eNB at the UE, $P_{TX}^{eNB}$ is the transmit power of the reference signal from the recipient eNB, $N_0 + I_{oc}^{eNB}$ is the RACH slot interference level at the recipient eNB, δ is a correction factor, and $K_{ramp}(m)$ is the amount of increase in transmit power for the m-th transmission.

In equation (1), $P_{RX}^{UE}$ is indicative of the received signal from the recipient eNB. The quantity $$\frac{I_{or}}{N_0 + I_{oc}^{UE}}$$

is a signal-to-other-cell-interference-plus-noise ratio for the time-frequency slots used for the downlink reference signal, as measured by the UE. The correction factor δ may be used to bias the open loop algorithm. The eNB transmit power $P_{TX}^{eNB}$, the RACH slot interference level $N_0+I_{oc}^{eNB}$, the correction factor δ and/or other parameters may be broadcast on the BCH by the recipient eNB. These parameters may be used to determine the transmit power of the random access preamble. The UE may estimate this transmit power so that the SNR of the random access preamble at the recipient eNB corresponds to a target value for the $SNR_{target}$.

Equation (1) may be rewritten in logarithm domain using units of decibel (dB), as follows:

$$\text{TX\_power} = -\text{RX\_power} + \text{interference\_correction} + \quad \text{Eq (2)}$$
$$\text{offset\_power} + \text{added\_correction} + \text{power\_ramp\_up}$$

where $$\text{TX\_power} = 10\log_{10}(P_{TX}^{UE}(m)),$$
$$\text{RX\_power} = 10\log_{10}(P_{RX}^{UE}),$$
$$\text{interference\_correction} = 10\log_{10}\left(1 + \frac{N_0 + I_{oc}^{UE}}{I_{or}}\right),$$
$$\text{offset\_power} =$$
$$10\log_{10}(SNR_{target}) + 10\log_{10}(P_{TX}^{eNB}) + 10\log_{10}(N_0 + I_{oc}^{eNB}),$$
$$\text{added\_correction} = 10\log_{10}(\delta), \text{ and}$$
$$\text{power\_ramp\_up} = 10\log_{10}(K_{ramp}(m)).$$

The quantities in equation (2) are in units of dB. The receive power and the interference correction may be measured by the UE. The offset power and the added correction may be signaled by the recipient eNB on the BCH.

Since the open loop estimate may not be every accurate, the UE may increase its transmit power for subsequent transmissions of the random access preamble. In one design, the power ramp up may be defined as follows:

$$\text{power\_ramp\_up} = (m-1) \times \text{power\_step}, \quad \text{Eq (3)}$$

where power_step is the amount of increase in transmit power for each failed transmission of the random access preamble. Equation (3) linearly increases the transmit power of the random access preamble starting with power_ramp_up=0 dB for the first transmission. The transmit power may also be increased based on some other linear or non-linear function.

Equations (1) through (3) show one design of determining the transmit power of the random access preamble. The transmit power may also be determined in other manners, e.g., with different parameters than those shown in equation (1) or (2). For example, default values may be used for $P_{TX}^{eNB}$, $N_0+I_{oc}^{eNB}$, $$\frac{I_{or}}{N_0 + I_{oc}^{UE}},$$

and/or other parameters. Alternatively, these parameters may be absorbed in the correction factor δ.

In one design, the transmit power of the first uplink message sent after successful transmission of the random access preamble may be determined as follows:

$$\text{PUSCH\_power} = \quad \text{Eq (4)}$$
$$\text{RACH\_power} + \text{PC\_correction} + \text{PUSCH\_RACH\_power\_offset}$$

where

RACH_power is the transmit power of the successful transmission of the random access preamble on the RACH, PUSCH_power is the transmit power of the message sent on the PUSCH, PC_correction is the PC correction received in the random access response, and PUSCH_RACH_power_offset is a power offset between the PUSCH and RACH.

In one design, the PC correction may indicate the amount of increase or decrease in transmit power and may be given with any number of bits (e.g., four bits) of resolution. In another design, the PC correction may simply indicate whether the transmit power should be increased or decreased by a predetermined amount. The PC correction may also be omitted or may be absorbed in the PUSCH to RACH power offset. The PUSCH to RACH power offset may be broadcast on the BCH by the eNB or may be provided by other means.

In one design, the same transmission parameter values and setting are used by all UEs. For example, the same target SNR and added correction may be used for the random access preamble by all UEs, and the same PUSCH to RACH power offset may be used for the first uplink message by all UEs.

In other designs, the UEs may be classified into multiple classes, and different transmission parameter values and settings may be used for different classes of UEs. The UEs may be classified in various manners. For example, the UEs may perform the random access procedure for various scenarios such as initial system access at power up, response to pages sent to the UE, data arriving at the UE, transition to active state, handover from one eNB to another eNB, etc. Different UE classes may be defined for different random access scenarios. In another design, the UEs may be classified based on their priorities, which may be determined based on service subscription and/or other factors. In yet another design, the UEs may be classified based on the types of messages being sent by these UEs. In general, any number of UE classes may be formed based on any set of factors, and each class may include any number of UEs.

In one design, different target SNR values may be used by UEs in different classes. For example, the UEs may be classified into two classes, a higher target SNR value may be used by UEs in a first class, and a lower target SNR value may be used by UEs in a second class. In general, UEs with the higher target SNR may be able to use more transmit power for their random access preambles, which may allow these random access preambles to be received with higher SNR at the eNBs. The use of different target SNR values by different classes of UEs may improve throughput of the RACH via a capture effect. For example, multiple UEs may transmit their random access preambles in the same RACH slot, which would then result in collisions of these random access preambles at an eNB. When a collision between two UEs in two classes occurs, a first random access preamble transmitted with the higher target SNR may observe less interference from a second random access preamble transmitted with the lower target SNR. Hence, the eNB may be able to correctly decode the first random access preamble and may or may not be able to decode the second random access preamble. The eNB may perform interference cancellation, estimate the interference due to the first random access preamble, cancel the estimated interference from the received signal, and then perform decoding for the second random access preamble. The likelihood of correctly decoding the second random access preamble may improve due to interference cancellation. Hence, the capture effect may allow the eNB to correctly decode all or a subset of the random access preambles transmitted in the same RACH slot. In contrast, if all UEs transmit their random access preambles with the same target SNR, then collisions between these UEs do not create the capture effect, and the eNB may not be able to correctly decode any of the random access preambles transmitted by these UEs. Consequently, all of these UEs may need to retransmit their random access preambles.

In another design, different correction factor values may be used for different classes of UEs. In yet another design, different power ramp up values may be used for different classes of UEs. For example, a higher power ramp up value may be used for one class of UEs to potentially reduce random access delay, and a lower power ramp up value may be used for another class of UEs. In yet another design, different backoff time values may be used for different classes of UEs. For example, a shorter backoff time may be used for one class of UEs to potentially reduce random access delay, and a longer backoff time may be used for another class of UEs.

In yet another design, different PUSCH to RACH power offset values may be used for different classes of UEs. This may allow the capture effect to be achieved for the first uplink messages sent by the UEs in different classes.

One or more of the parameters in equation (2) and/or (4) may have different values for different UE classes, as described above. In other designs, one or more parameters in equation (2) and/or (4) may have values that are specific for individual UEs. In one design, the target SNR and/or the correction factor $\delta$ may have UE-specific values. In this design, each UE may transmit its random access preamble with transmit power determined based on the target SNR and/or the correction factor for that UE. A default value or a broadcast value may be used for each parameter for which the UE-specific value is not available.

In another design, the PUSCH to RACH power offset may have UE-specific values. In this design, each UE may transmit its first uplink message with transmit power determined based on the PUSCH to RACH power offset value for that UE (or with a default or broadcast value if the UE-specific value is not available).

Figure 7:
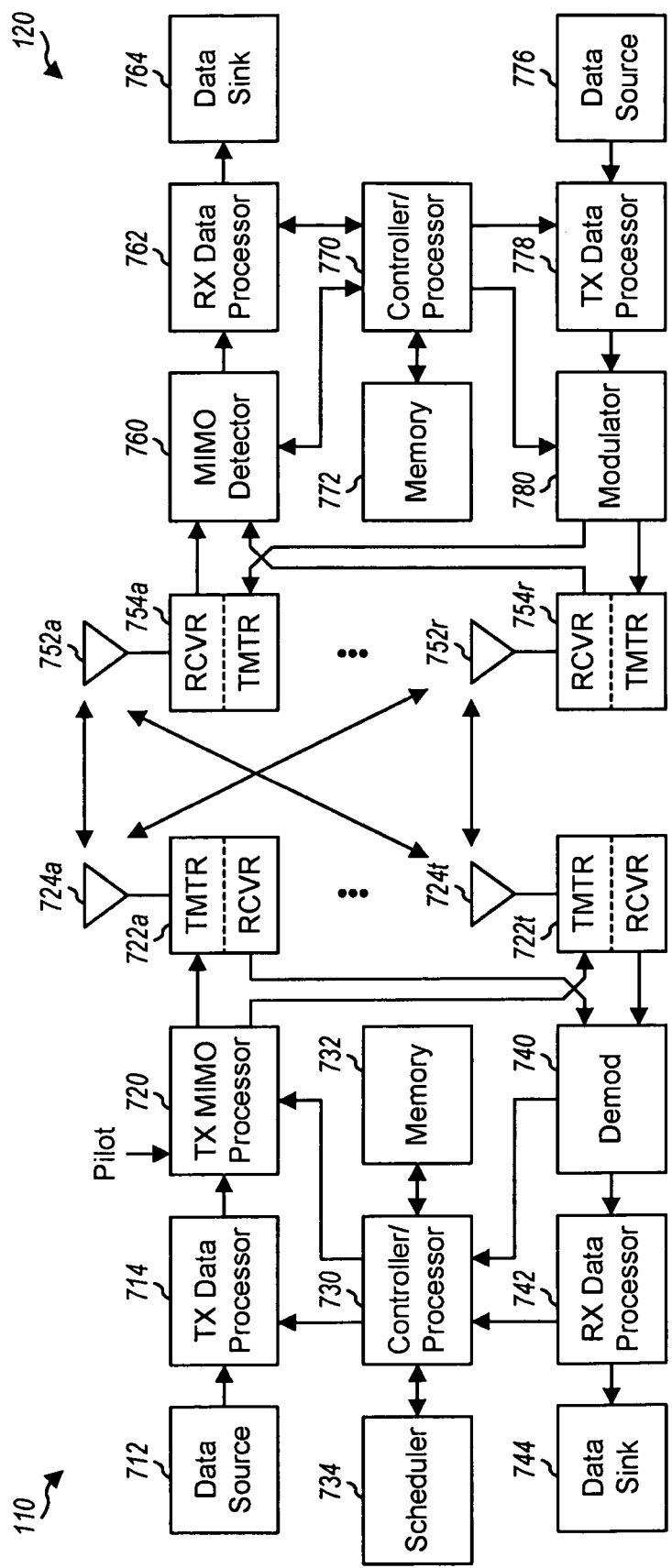
FIG. 7 shows a block diagram of an eNB and a UE.

FIG. 7 shows a block diagram of a design of eNB 110 and UE 120, which are one of the eNBs and one of the UEs in FIG. 1. In this design, eNB 110 is equipped with T antennas 724a through 724t, and UE 120 is equipped with R antennas 752a through 752r, where in general T≥1 and R≥1.

At eNB 110, a transmit (TX) data processor 714 may receive traffic data for one or more UEs from a data source 712. TX data processor 714 may process (e.g., format, encode, and interleave) the traffic data for each UE based on one or more coding schemes selected for that UE to obtain coded data. TX data processor 714 may then modulate (or symbol map) the coded data for each UE based on one or more modulation schemes (e.g., BPSK, QSPK, PSK or QAM) selected for that UE to obtain modulation symbols. A TX MIMO processor 720 may multiplex the modulation symbols for all UEs with pilot symbols using any multiplexing scheme. Pilot is typically known data that is processed in a known manner and may be used by a receiver for channel estimation and other purposes. TX MIMO processor 720 may process (e.g., precode) the multiplexed modulation symbols and pilot symbols and provide T output symbol streams to T transmitters (TMTR) 722a through 722t. In certain designs, TX MIMO processor 720 may apply beamforming weights to the modulation symbols to spatially steer these symbols. Each transmitter 722 may process a respective output symbol stream, e.g., for orthogonal frequency division multiplexing (OFDM), to obtain an output chip stream. Each transmitter 722 may further process (e.g., convert to analog, amplify, filter, and upconvert) the output chip stream to obtain a downlink signal. T downlink signals from transmitters 722a through 722t may be transmitted via T antennas 724a through 724t, respectively.

At UE 120, antennas 752a through 752r may receive the downlink signals from eNB 110 and provide received signals to receivers (RCVR) 754a through 754r, respectively. Each receiver 754 may condition (e.g., filter, amplify, downconvert, and digitize) a respective received signal to obtain samples and may further process the samples (e.g., for OFDM) to obtain received symbols. A MIMO detector 760 may receive and process the received symbols from all R receivers 754a through 754r based on a MIMO receiver processing technique to obtain detected symbols, which are estimates of the modulation symbols transmitted by eNB 110. A receive (RX) data processor 762 may then process (e.g., demodulate, deinterleave, and decode) the detected symbols and provide decoded data for UE 120 to a data sink 764. In general, the processing by MIMO detector 760 and RX data processor 762 is complementary to the processing by TX MIMO processor 720 and TX data processor 714 at eNB 110.

On the uplink, at UE 120, traffic data from a data source 776 and signaling (e.g., random access signaling) may be processed by a TX data processor 778, further processed by a modulator 780, conditioned by transmitters 754a through 754r, and transmitted to eNB 110. At eNB 110, the uplink signals from UE 120 may be received by antennas 724, conditioned by receivers 722, demodulated by a demodulator 740, and processed by an RX data processor 742 to obtain the traffic data and signaling transmitted by UE 120.

Controllers/processors 730 and 770 may direct the operation at eNB 110 and UE 120, respectively. Memories 732 and 772 may store data and program codes for eNB 110 and UE 120, respectively. A scheduler 734 may schedule UEs for downlink and/or uplink transmission and may provide assignments of resources for the scheduled UEs.

FIG. 8 shows a design of a process 800 for transmitting random access signaling by a UE. At least one parameter value for at least one transmission parameter for random access signaling may be determined based on a particular UE class, with the at least one transmission parameter having different values for a plurality of UE classes (block 812). The random access signaling may be sent based on the at least one parameter value for system access, e.g., for initial system access at power up, system access to transition to an active state, or system access for handover (block 814). The at least one transmission parameter may comprise a target SNR, a power offset, a correction factor, etc. The transmit power of the random access signaling may be determined based on the at least one parameter value, and the random access signaling may be sent with the determined transmit power.

In one design, the random access signaling may be a random access preamble, and the at least one transmission parameter may comprise a target SNR for the random access preamble. The transmit power of the random access preamble may be determined based on a target SNR value for the particular UE class and other parameters such as received power for a reference signal, an interference level of a time-frequency slot used to send the random access preamble, a power offset, a correction factor, etc. The random access preamble may be sent with the determined transmit power. The at least one transmission parameter may comprise a backoff time, and the amount of time to wait between successive transmissions of the random access preamble may be determined based on a backoff time value for the particular UE class. The at least one transmission parameter may comprise a power ramp, and the transmit power for successive transmissions of the random access preamble may be determined based on a power ramp value for the particular UE class.

In another design, the random access signaling may be a message sent after receiving a random access response for the random access preamble. The at least one transmission parameter may comprise a power offset between a first channel (e.g., the RACH) used to send the random access preamble and a second channel (e.g., the PUSCH) used to send the message. The transmit power of the message may be determined based on a power offset value for the particular UE class and possibly other parameters such as a PC correction. The message may then be sent with the determined transmit power.

FIG. 9 shows a design of an apparatus 900 for transmitting random access signaling. Apparatus 900 includes means for determining at least one parameter value for at least one transmission parameter for random access signaling based on a particular UE class, with the at least one transmission parameter having different values for a plurality of UE classes (module 912), and means for sending the random access signaling based on the at least one parameter value for system access (module 914).

FIG. 10 shows a design of a process 1000 for transmitting a message for system access. A random access preamble may be sent for system access (block 1012). A random access response with a PC correction may be received (block 1014). The transmit power of a message may be determined based on the PC correction and possibly other parameters (block 1016). For example, the transmit power of the message may be determined further based on the transmit power of the random access preamble, a power offset between a first channel used to send the random access preamble and a second channel used to send the message, etc. The message may be sent with the determined transmit power (block 1018).

The PC correction may be generated based on received signal quality of the random access preamble at a base station. The PC correction may indicate the amount of increase or decrease in transmit power for the message. The PC correction may also indicate whether to increase or decrease the transmit power by a predetermined amount.

FIG. 11 shows a design of an apparatus 1100 for transmitting a message for system access. Apparatus 1100 includes means for sending a random access preamble for system access (module 1112), means for receiving a random access response with a PC correction (module 1114), means for determining the transmit power of a message based on the PC correction and possibly other parameters (module 1116), and means for sending the message with the determined transmit power (module 1118).

The modules in FIGS. 9 and 11 may comprise processors, electronics devices, hardware devices, electronics components, logical circuits, memories, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
at least one processor configured to determine at least one parameter value for at least one transmission parameter for random access signaling based on a particular user equipment (UE) class, the at least one transmission parameter having different values for a plurality of UE classes, and to send the random access signaling based on the at least one parameter value for system access; and
a memory coupled to the at least one processor;
wherein the at least one processor is further configured to send a random access preamble on a first channel, to receive a random access response on a physical downlink control channel (PDCCH) or a physical downlink shared channel (PDSCH) comprising a radio network temporary identifier (RNTI), a timing advance, uplink (UL) resources and a power control (PC) correction, and to send a message as the random access signaling on a second channel; and
wherein the at least one processor is further configured to determine a transmit power based on the at least one transmission parameter value.

2. The apparatus of claim 1, wherein the at least one transmission parameter comprises at least one of a target signal-to-noise ratio (SNR), a power offset, and a correction factor.

3. The apparatus of claim 1, wherein the random access signaling comprises a random access preamble sent first for system access.

4. The apparatus of claim 3, wherein the at least one transmission parameter comprises a target signal-to-noise ratio (SNR) for the random access preamble, transmit power of the random access preamble is based on a target SNR value for the particular UE class, and wherein the at least one processor is further configured to send the random access preamble with the determined transmit power.

5. The apparatus of claim 1, wherein transmit power of the random access preamble is based on an interference level of a time-frequency slot used to send the random access preamble.

6. The apparatus of claim 1, wherein the at least one transmission parameter comprises a backoff time, and wherein the at least one processor is configured to determine amount of time to wait between successive transmissions of the random access preamble based on a backoff time value for the particular UE class.

7. The apparatus of claim 1, wherein the at least one transmission parameter comprises a power ramp, and wherein transmit power for successive transmissions of the random access preamble is based on a power ramp value for the particular UE class.

8. The apparatus of claim 1, wherein the at least one transmission parameter comprises a power offset between the first and second channels, and wherein transmit power of the message is based on a power offset value for the particular UE class, and wherein the at least one processor is further configured to send the message with the determined transmit power.

9. The apparatus of claim 1, wherein the at least one processor is configured to send the random access signaling for initial system access at power up, or for system access to transition to an active state, or for system access for handover.

10. A method for wireless communication, comprising:
determining at least one parameter value for at least one transmission parameter for random access signaling based on a particular user equipment (UE) class, the at least one transmission parameter having different values for a plurality of UE classes; and
sending the random access signaling based on the at least one parameter value for system access;
wherein the step of sending the random access signaling comprises sending a random access preamble on a first channel to receive a random access response on a physical downlink control channel (PDCCH) or a physical downlink shared channel (PDSCH) comprising a radio network temporary identifier (RNTI), a timing advance, uplink (UL) resources and a power control (PC) correction, and sending a message as the random access signaling on a second channel; and
determining a transmit power based on the at least one transmission parameter value.

11. The method of claim 10, wherein the at least one transmission parameter comprises a target signal-to-noise ratio (SNR) for the random access preamble, and wherein the sending the random access signaling comprises:
the step of determining transmit power of the random access preamble based on a target SNR value for the particular UE class, and
sending the random access preamble with the determined transmit power.

12. The method of claim 10, wherein the at least one transmission parameter comprises a backoff time, and wherein the method further comprises:
determining amount of time to wait between successive transmissions of the random access preamble based on a backoff time value for the particular UE class.

13. The method of claim 10, wherein the at least one transmission parameter comprises a power ramp, and wherein the method further comprises:
determining transmit power for successive transmissions of the random access preamble based on a power ramp value for the particular UE class.

14. The method of claim 10, wherein the at least one transmission parameter comprises a power offset between the first and second channels, and wherein the sending the random access signaling comprises: and
further comprising:
receiving the random access response;

determining transmit power of the message based on a power offset value for the particular UE class, and wherein sending the message comprises sending the message with the determined transmit power.

15. An apparatus for wireless communication, comprising:
means for determining at least one parameter value for at least one transmission parameter for random access signaling based on a particular user equipment (UE) class, the at least one transmission parameter having different values for a plurality of UE classes; and means for sending the random access signaling based on the at least one parameter value for system access;

wherein the means for sending the random access signaling comprises a means for sending a random access preamble on a first channel to receive a random access response on a physical downlink control channel (PDCCH) or a physical downlink shared channel (PDSCH) comprising a radio network temporary identifier (RNTI), a timing advance, uplink (UL) resources and a power control (PC) correction, and a means for sending a message as the random access signaling on a second channel; and a means for determining a transmit power based on the at least one transmission parameter value.

16. The apparatus of claim 15, wherein the at least one transmission parameter comprises a target signal-to-noise ratio (SNR) for the random access preamble, and wherein the means for sending the random access signaling comprises:
means for determining transmit power of the random access preamble based on a target SNR value for the particular UE class, and
means for sending the random access preamble with the determined transmit power.

17. The apparatus of claim 15, wherein the at least one transmission parameter comprises a backoff time, and wherein the apparatus further comprises:
means for determining amount of time to wait between successive transmissions of the random access preamble based on a backoff time value for the particular UE class.

18. The apparatus of claim 15, wherein the at least one transmission parameter comprises a power ramp, and wherein the apparatus further comprises:
means for determining transmit power for successive transmissions of the random access preamble based on a power ramp value for the particular UE class.

19. The apparatus of claim 15, wherein the at least one transmission parameter comprises a power offset between the first and second channels, and wherein the means for sending the random access signaling comprises: and
further comprising:
means for receiving the random access response; and
means for determining transmit power of the message based on a power offset value for the particular UE class;
wherein the means for sending the message comprises means for sending the message with the determined transmit power.

20. A non-transitory computer readable medium comprising instructions which, when executed by a processor, cause the processor to perform operations including:
determining at least one parameter value for at least one transmission parameter for random access signaling based on a particular user equipment (UE) class, the at least one transmission parameter having different values for a plurality of UE classes; and
sending the random access signaling based on the at least one parameter value for system access;

wherein sending the random access signaling comprises sending a random access preamble on a first channel to receive a random access response on a physical downlink control channel (PDCCH) or physical downlink shared channel (PDSCH) comprising a radio network temporary identifier (RNTI), a timing advance, uplink (UL) resources and a power control (PC) correction, and sending a message as the random access signaling on a second channel; and determining a transmit power based on the at least one parameter value.

21. An apparatus for wireless communication, comprising:
at least one processor configured to send a random access preamble for system access, to receive a random access response with a power control (PC) correction, uplink (UL) resources and a timing advance on a physical downlink control channel (PDCCH) or a physical downlink shared channel (PDSCH) comprising a radio network temporary identifier (RNTI), to send a message as random access signaling on a second channel, to determine transmit power of a message based on the PC correction, and to send the message with the determined transmit power; and
a memory coupled to the at least one processor.

22. The apparatus of claim 21, wherein the at least one processor is configured to determine the transmit power of the message further based on transmit power of the random access preamble.

23. The apparatus of claim 21, wherein the at least one processor is configured to determine the transmit power of the message further based on a power offset between a first channel used to send the random access preamble and a second channel used to send the message.

24. The apparatus of claim 21, wherein the PC correction indicates an amount of increase or decrease in transmit power.

25. The apparatus of claim 21, wherein the PC correction indicates whether to increase or decrease transmit power by a predetermined amount.

26. The apparatus of claim 21, wherein the PC correction is generated based on received signal quality of the random access preamble at a base station.

27. A method for wireless communication, comprising:
sending a random access preamble for system access;
receiving a random access response with a power control (PC) correction, uplink (UL) resources and a timing advance on a physical downlink control channel (PDCCH) or a physical downlink shared channel (PDSCH) comprising a radio network temporary identifier (RNTI) to send a message as random access signaling on a second channel;
determining transmit power of a message based on the PC correction; and
sending the message with the determined transmit power.

28. The method of claim 27, wherein the determining the transmit power of the message comprises determining the transmit power of the message further based on transmit power of the random access preamble.

29. The method of claim 27, wherein the determining the transmit power of the message comprises determining the transmit power of the message further based on a power offset between a first channel used to send the random access preamble and a second channel used to send the message.

30. An apparatus for wireless communication, comprising:
means for sending a random access preamble for system access;
means for receiving a random access response with a power control (PC) correction, uplink (UL) resources and a timing advance on a physical downlink control channel (PDCCH) or a physical downlink shared channel (PDSCH) comprising a radio network temporary identifier (RNTI) to send a message as random access signaling on a second channel;

means for determining transmit power of a message based on the PC correction; and means for sending the message with the determined transmit power.

31. The apparatus of claim 30, wherein the means for determining the transmit power of the message comprises means for determine the transmit power of the message further based on transmit power of the random access preamble.

32. The apparatus of claim 30, wherein the means for determining the transmit power of the message comprises means for determining the transmit power of the message further based on a power offset between a first channel used to send the random access preamble and a second channel used to send the message.

33. A non-transitory computer readable medium comprising instructions which, when executed by a processor, cause the processor to perform operations including:

sending a random access preamble for system access;

receiving a random access response with a power control (PC) correction, uplink (UL) resources and a timing advance on a physical downlink control channel (PDCCH) or a physical downlink shared channel (PDSCH) comprising a radio network temporary identifier (RNTI) to send a message as random access signaling on a second channel;

determining transmit power of a message based on the PC correction; and sending the message with the determined transmit power.

* * * * *